(No Model.) 3 Sheets—Sheet 2.
JOHN YOUNG & JAMES YOUNG.
LATHE.
No. 539,110. Patented May 14, 1895.

(No Model.) 3 Sheets—Sheet 3.
JOHN YOUNG & JAMES YOUNG.
LATHE.
No. 539,110. Patented May 14, 1895.
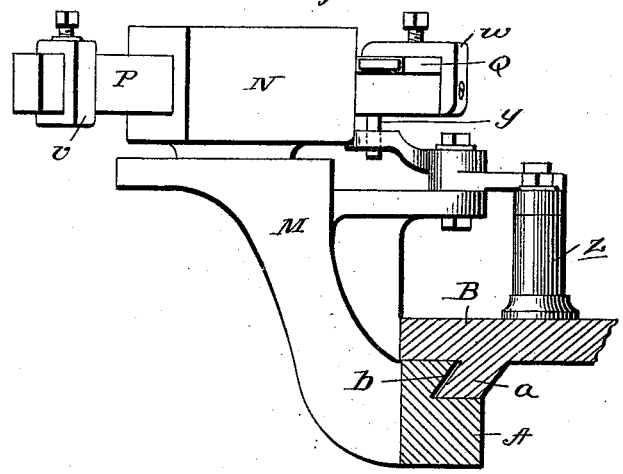
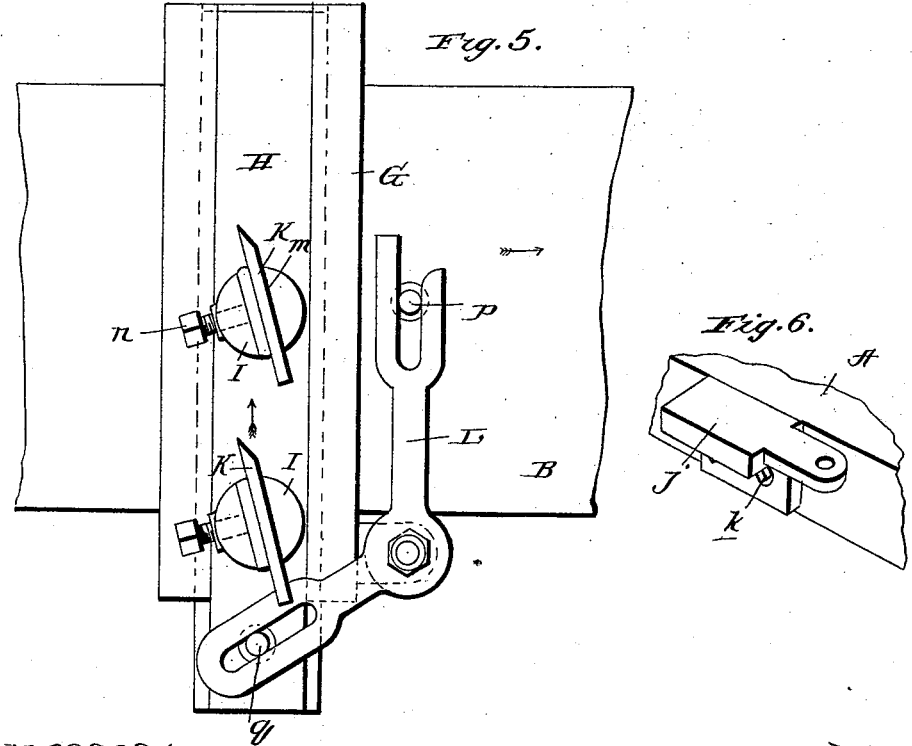
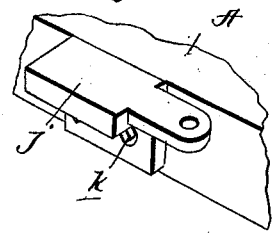

UNITED STATES PATENT OFFICE.

JOHN YOUNG AND JAMES YOUNG, OF WOONSOCKET, RHODE ISLAND.

LATHE.

SPECIFICATION forming part of Letters Patent No. 539,110, dated May 14, 1895.

Application filed December 2, 1893. Serial No. 492,635. (No model.)

*To all whom it may concern:*

Be it known that we, JOHN YOUNG and JAMES YOUNG, subjects of the Queen of Great Britain, residing at Woonsocket, in the county of Providence and State of Rhode Island, have invented certain new and useful Improvements in Lathes; and we do declare the following to be a full, clear, and exact description of the invention, such as will enable others skilled in the art to which it appertains to make and use the same.

Our invention relates to improvements in lathes for turning irregular forms; and it has for its general object to provide such a lathe adapted more especially for turning spool heads and the like as will be presently described.

Other objects and advantages will be fully understood from the following description and claims when taken in connection with the annexed drawings, in which—

Figure 1:
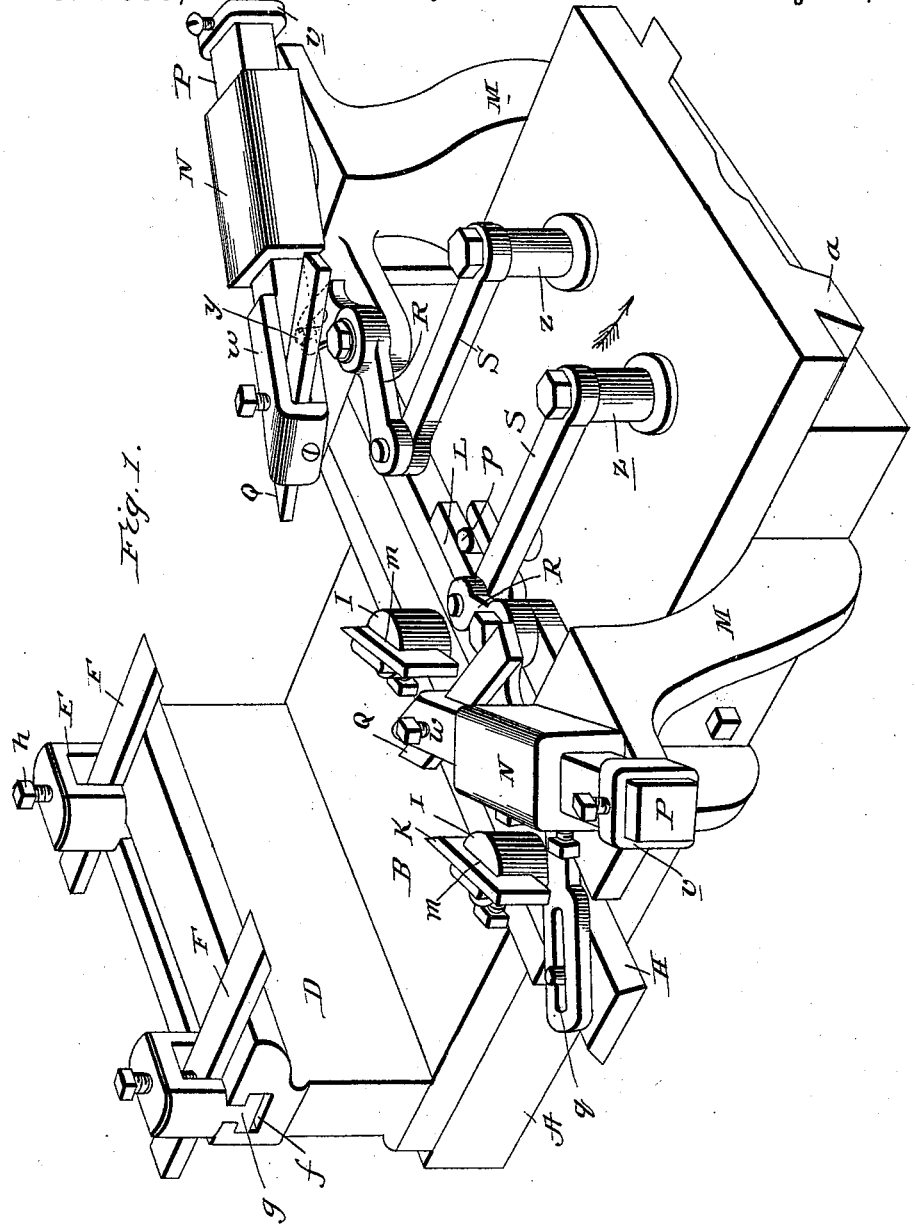
Figure 2:
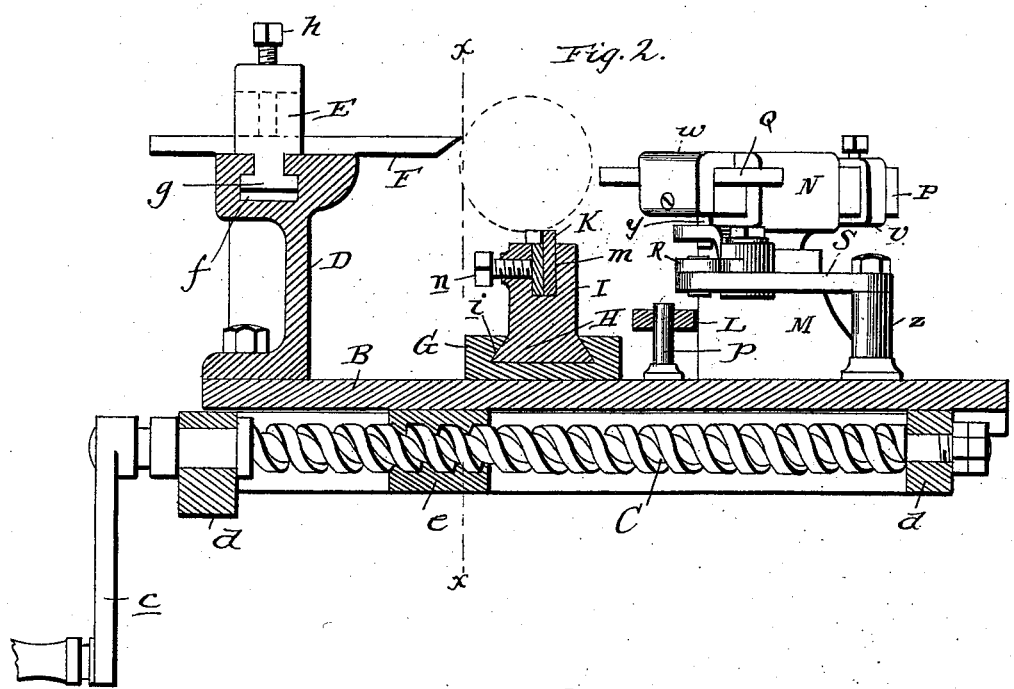
Figure 3:
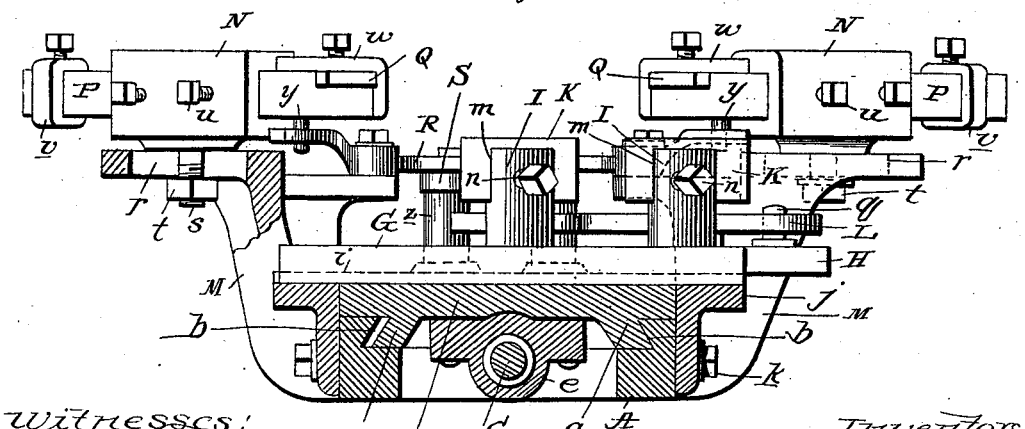

Figure 1 is a perspective view of a lathe-carriage embodying our invention. Fig. 2 is a vertical longitudinal section of the same on a reduced scale. Fig. 3 is a transverse section taken in the plane indicated by the line $x$ $x$ of Fig. 2. Fig. 4 is a detail perspective view, partly in section, illustrating one of the laterally-oblique tool-carrying slide-bars, together with the mechanism for moving the same into and out of an operative position. Fig. 5 is a detail plan illustrating the transverse slide and the mechanism for moving the same, and Fig. 6 is a detail view.

Referring by letter to said drawings, A, indicates a lathe-carriage which may be mounted upon the ways of a lathe in any approved manner; and B, indicates the longitudinally-movable slide-rest which is provided with depending projections $a$, to engage undercut ways $b$, in the carriage and is designed to be moved to and fro by the screw C. This screw C, is provided with a suitable handle as $c$, whereby it may be readily turned, and it is journaled in suitable bearings $d$, fixed with respect to the carriage A, and engages an interiorly threaded projection or nut $e$, carried by the slide rest B, as illustrated.

D, indicates a support which is arranged transversely of the slide-rest B, preferably at one end thereof, and is fixed with respect thereto in any approved manner. This support is provided in its upper side with a groove or way $f$, which extends its entire length and is preferably of a T-shape in cross section with the reduced portion uppermost, and this groove or way is designed to receive the correspondingly shaped depending projections $g$, of the tool posts or holders E, which are provided with the openings $e^7$, which extend to the groove $f$, in the support D, and are designed to receive the tools F, as shown. The said tools F, are designed to square the ends of the spool as will be presently described, and they are fixed in the posts or holders E, by the vertical screws $h$, which bind them against the top of the support D, and thereby serve the additional function of adjustably fixing the posts or holders with respect to the said support. Thus it will be seen that the tools F, may be fixed at various distances apart and the lathe thereby adapted to turn spools or the like of different lengths.

Arranged transversely of the carriage A, above the slide-rest B, and at about the point illustrated in advance of the support D, is a fixed transverse slide or bed G, which is provided in its upper side with a longitudinal groove $i$, preferably of dovetail form in cross-section, as shown. This slide or bed G, is provided with brackets $j$, which are connected to the carriage A, by screws $k$, and it is designed to receive the dovetail slide-rest H, which carries tool posts I, as shown. These tool posts I, are provided with diametrical notches or bifurcations $m$, to receive the tools K, which are adjustably fixed by screws as $n$, in the manner illustrated. The said tools K, are preferably pitched at an acute angle to the line of movement of the slide-rest H, as shown, and they are designed and adapted to engage the peripheral edges of the spool head blanks and reduce the same to the desired size and shape as will be more fully hereinafter set forth. The slide rest H, is moved to and fro so as to carry the tools K, into and out of engagement with the stock, by the longitudinally-movable, slide-rest B, through the medium of the lever L. This lever L, is fulcrumed upon an extension of one of the brackets $j$, as better illustrated in Fig. 6, and it has one end bifurcated to engage a stud $p$, carried by the slide-rest B, and its opposite end slotted to engage a stud $q$, carried by slide-rest H; whereby it will be seen that when the slide-rest B, is moved in the direction of the arrow, the slide-rest H, will be moved in the direction indicated so as to carry the tools K, into engagement with the stock, and when the slide-rest B, is moved in a direction opposite to that indicated, the slide rest H, will be moved so as to carry the tools K, away from the stock.

M, indicates lateral bracket-arms which are fixed with respect to the carriage A, and extend upwardly from opposite sides thereof, as shown. These arms M, preferably have their free ends flattened as shown, and provided with slots as $r$, for the passage of the depending bolts $s$, of the tool-supporting sleeves N, which bolts $s$, are provided with nuts as $t$, whereby it will be seen that the sleeves may be adjustably fixed in various positions upon the arms M, for a purpose presently set forth.

The sleeves N, are preferably provided with gib screws as $u$, to steady the movement of the slide-rests P, which are provided with collars $v$, designed to be adjustably fixed on said rests so as to limit the inward movement of the same. These slide-rests P, are also provided, at their inner ends with suitable clamps as $w$, which are designed to receive and hold the cutting tools Q, which are preferably disposed tangentially with respect to the rests P, and preferably have their cutting-edges beveled as shown so as to adapt them to form the inner beveled sides of the spool heads.

Motion is transmitted from the longitudinally-movable slide-rest B, to the slide-rests P, through the medium of the levers R, which are fulcrumed on extensions of the arms M, and have their outer ends bifurcated or slotted to engage studs $y$, on the rests P, and the links or pitmen S, which are connected to the inner ends of the levers R, and to posts $z$, rising from the slide rest B, as shown. By reason of this construction it will be seen that when the slide rest moves in the direction of the arrow (see Fig. 1), the slide rests P, will be moved inwardly so as to carry the tools Q, into engagement with the stock, and when the slide rest B, is moved in a direction opposite to that indicated, the slide-rests P, will be moved so as to carry their tools away from the stock.

In a prior application for Letters Patent, filed October 16, 1893, Serial No. 488,307, we have disclosed a lathe adapted to turn the intermediate or body portion of a spool and the reduced ends thereof; and if desired the lathe disclosed in our present application may be employed to complete the spool formed by the lathe disclosed in said prior application. This is ordinarily accomplished by securing the blank heads of wood upon the reduced ends of the spools as they come from the lathe of the said prior application, and then placing the spool in the centers of the lathe herein described, and rotating it at a high rate of speed in engagement with the cutters F, K, and Q.

It will be noticed from the foregoing description taken in connection with the drawings that by rotating the screw C, so as to move the slide-rest B, in the direction of the arrow (see Fig. 1), all of the tools F, K, and Q, will be simultaneously carried into engagement with the stock and by rotating the screw and moving the slide-rest B, in an opposite direction to that indicated, all of the tools will be moved away from the stock so as to permit of a ready removal of the same.

While we have described our improved lathe as being especially designed for turning spool-heads, and the like, we do not desire to be understood as confining ourselves to such use, as the lathe may be employed to do any work which it is adapted to accomplish.

Having described our invention, what we claim is—

1. In a lathe, the combination of a transversely movable slide rest and a longitudinally movable slide rest connected by intermediate mechanism with the transversely movable slide rest, whereby when the longitudinally-movable slide rest is moved, the transversely-movable slide rest will be moved in a direction transverse to the line of movement of said longitudinally-movable slide rest, substantially as and for the purpose set forth.

2. In a lathe, the combination of a carriage, a longitudinally-movable slide rest, a transversely movable slide rest, and an angular lever fulcrumed at an intermediate point of its length and connected with the slide rests, whereby, when the longitudinally-movable slide rest is moved, the transversely movable slide rest will be moved in a direction transverse to the line of movement of said longitudinally movable slide rest, substantially as and for the purpose set forth.

3. In a lathe, the combination of a longitudinally-movable slide-rest, a transversely-movable slide-rest, slide rests disposed at an angle to the longitudinally and transversely movable slide-rests, mechanism intermediate of the longitudinally-movable slide-rest and the transversely movable slide-rest for transmitting motion from the former to the latter, and mechanism intermediate of the longitudinally-movable slide-rest and the angularly-disposed slide-rests adapted to transmit motion to said angularly-disposed slide-rests, substantially as specified.

4. In a lathe, the combination of a longitudinally-movable slide-rest, slide-rests as P, levers fulcrumed at an intermediate point of their length and having one of their ends connected with the slide rests P, and links or pitmen connecting the opposite ends of said levers and the longitudinally movable slide rest, substantially as and for the purpose set forth.

5. In a lathe, the combination of a longitudinally-movable slide-rest, a transversely-movable slide-rest, slide rests as P, a lever intermediate of the longitudinally-movable slide-rest and the transversely-movable slide-rest adapted to transmit motion from the former to the latter, levers engaging the slide rests P, and links or pitmen intermediate of the longitudinally-movable slide-rests and said levers, substantially as specified.

6. In a lathe, the combination of a longitudinally-movable slide-rest having a stud as $p$, a transversely-movable slide-rest having a stud $q$, and a lever fulcrumed upon a stationary pintle and engaging the studs $p$, and $q$, substantially as specified.

7. In a lathe, the combination of a carriage, bracket-arms fixedly connected to the carriage and extending upwardly from opposite sides thereof, a longitudinally-movable slide-rest mounted on the carriage, a transversely-movable slide-rest mounted in a bed or slide fixed with respect to the carriage, slide rests as P, mounted in holders arranged on the bracket-arms, mechanism intermediate of the longitudinally-movable and transversely-movable slide-rests, adapted to transmit motion from the former to the latter, and mechanism intermediate the longitudinally-movable slide-rests and the slide-rests P, to transmit motion to said rests P, substantially as specified.

8. In a lathe, the combination of a longitudinally-movable slide-rest, cutting-tools carried by said slide-rest and disposed in the direction of movement thereof, a transversely-movable slide-rest, cutting tools carried by said transversely-movable slide-rest and disposed at an angle to the line of movement thereof, slide-rests as P, disposed at an angle to the longitudinally and transversely movable slide-rests, cutting tools carried by said slide-rests P, and disposed tangentially with respect to said slide-rests, and a suitable means for moving the several slide rests so as to carry their cutting tools into and out of engagement with the stock, substantially as specified.

9. In a lathe, the combination of a screw, a longitudinally-movable slide-rest, a transversely-movable slide rest, slide rests as P, disposed at an angle to the longitudinally and transversely movable slide-rests, and mechanism intermediate of the screw and the several slide-rests adapted to simultaneously move said slide-rests when the screw is rotated, substantially as specified.

10. In a lathe for making spools, the combination with a mechanism for reducing the diameter of the spool heads, and mechanism for reducing the thickness of said heads, of finishing or beveling devices consisting of slides diverging from each other, carrying cutters or knives and connected with a slide rest or carriage, and mechanism for moving the slides and carriage, substantially as specified.

11. In a lathe, the combination of a slide rest or carriage, a cutting tool carried by said slide rest, a slide rest movable in a line transverse to the line of movement of the first named slide rest, a cutting tool carried by said latter slide rest, slide-rests disposed at an angle to the first and second named slide rests, cutting tools carried by said angularly disposed slide-rests and suitable means for moving the several slide rests so as to enable their cutting tools to perform their functions, substantially as specified.

In testimony whereof we affix our signatures in presence of two witnesses.

JOHN YOUNG.
JAMES YOUNG.

Witnesses:
 WALTER I. BALLOU,
 GEO. W. SPAULDING.